United States Patent
Brummel (10) Patent No.: US 10,244,732 B2
(45) Date of Patent: Apr. 2, 2019

(54) MILKING DEVICE

(71) Applicant: Lely Patent N.V., Maassluis (NL)

(72) Inventor: Mark Brummel, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 314 days.

(21) Appl. No.: 14/427,514

(22) PCT Filed: Aug. 20, 2013

(86) PCT No.: PCT/NL2013/050606
§ 371 (c)(1),
(2) Date: Mar. 11, 2015

(87) PCT Pub. No.: WO2014/042520
PCT Pub. Date: Mar. 20, 2014

(65) Prior Publication Data
US 2015/0208608 A1    Jul. 30, 2015

(30) Foreign Application Priority Data
Sep. 14, 2012 (NL) ..................... 2009464

(51) Int. Cl.
*A01K 1/12* (2006.01)
*A01K 5/01* (2006.01)
*A01K 5/02* (2006.01)

(52) U.S. Cl.
CPC .............. *A01K 1/126* (2013.01); *A01K 5/01* (2013.01); *A01K 5/0275* (2013.01)

(58) Field of Classification Search
CPC ......... A01K 1/126; A01K 5/01; A01K 5/0275
See application file for complete search history.

(56) References Cited

U.S. PATENT DOCUMENTS

| 3,103,912 A * | 9/1963 | Benedetto ............. A01K 1/126 119/14.04 |
| 3,116,713 A * | 1/1964 | Darling ................. A01K 1/126 119/14.04 |
| 3,765,373 A * | 10/1973 | Phillips ................. A01K 1/126 119/14.04 |

(Continued)

FOREIGN PATENT DOCUMENTS

| EP | 0 689 761 A1 | 1/1996 |
| FR | 2 649 858 A1 | 1/1991 |

(Continued)

OTHER PUBLICATIONS

International Search Report and Written Opinion dated Nov. 14, 2013 in PCT/NL2013/050606 Filed Aug. 20, 2013.

*Primary Examiner* — Stanton L Krycinski
(74) *Attorney, Agent, or Firm* — Oblon, McClelland, Maier & Neustadt, L.L.P.

(57) ABSTRACT

A milking device, including: a platform that is rotatable in a direction of rotation and includes an edge and a plurality of milking stations, and a milking mechanism for milking a dairy animal; a plurality of feeding troughs which are distributed along the edge, outside next to the platform on a fixed world frame and within reach of the dairy animals on the milking stations. The feeding troughs do not have to be made unnecessarily complicated and movable or foldable, so that reliability of in particular the feed portion of such a milking device can be improved.

21 Claims, 3 Drawing Sheets

(56) References Cited

U.S. PATENT DOCUMENTS

| | | | | |
|---|---|---|---|---|
| 3,835,814 A * | 9/1974 | Jacobs | A01K 1/126 119/14.04 |
| 6,050,219 A * | 4/2000 | van der Lely | A01J 5/0175 119/14.04 |
| 7,255,063 B2 * | 8/2007 | Van Den Berg | A01J 5/017 119/14.03 |
| 7,270,078 B2 * | 9/2007 | Van Den Berg | A01J 5/017 119/14.04 |
| 7,370,604 B2 * | 5/2008 | Van Den Berg | A01J 5/017 119/14.02 |
| 8,074,600 B2 * | 12/2011 | Kallen | A01K 1/126 119/14.04 |
| 8,281,743 B2 * | 10/2012 | Axelsson | A01K 1/126 119/14.02 |
| 8,286,584 B2 * | 10/2012 | Lindstrom | A01K 1/126 119/14.02 |
| 8,291,860 B2 * | 10/2012 | Danneker | A01K 1/126 119/14.04 |
| 8,616,155 B2 * | 12/2013 | Vollmer | A01K 1/126 119/14.04 |
| 8,624,744 B2 * | 1/2014 | Holmgren | A01J 5/0175 119/14.02 |
| 8,646,410 B2 * | 2/2014 | Van Den Berg | A01J 5/0175 119/14.02 |
| 8,646,412 B2 * | 2/2014 | Eriksson | A01K 1/126 119/14.04 |
| 8,807,079 B2 * | 8/2014 | Nilsson | A01J 5/017 119/14.02 |
| 2005/0115506 A1 * | 6/2005 | Van Den Berg | A01J 5/017 119/14.03 |
| 2011/0308469 A1 * | 12/2011 | Vollmer | A01K 1/126 119/14.04 |
| 2012/0000427 A1 * | 1/2012 | Nilsson | A01J 5/017 119/14.02 |
| 2012/0200674 A1 * | 8/2012 | Hofman | A01J 5/0175 348/46 |
| 2012/0216748 A1 * | 8/2012 | Hofman | A01J 5/007 119/14.02 |
| 2013/0087100 A1 * | 4/2013 | Nilsson | A01J 5/007 119/14.02 |
| 2014/0331934 A1 * | 11/2014 | Eriksson | A01K 1/126 119/14.04 |
| 2015/0181836 A1 * | 7/2015 | Obermuller | A01J 5/007 119/14.02 |

FOREIGN PATENT DOCUMENTS

| | | | |
|---|---|---|---|
| GB | 1305849 A * | 2/1973 | A01K 1/126 |
| GB | 1 437 387 A | 5/1976 | |

* cited by examiner

MILKING DEVICE

The present invention relates to a milking device, in particular a milking device comprising a platform which is rotatable in a direction of rotation and has an edge and a plurality of milking stations, and having milking means for milking a dairy animal.

Such milking devices are well known in the state of the art and are referred to as a milking carousel. Milking carousels are often used for milking large groups of animals at fixed times, with the milking means being connected to the teats of the dairy animals by milkers, but milking carousels are also known in which the milking cups are connected automatically.

Providing concentrate is an important means for luring dairy animals to the milking device or to keep the animals calm during milking. To this end, the platform is provided with feeding troughs, the construction of which is often needlessly complicated and comprises all kinds of moving parts and connections. In practice, it has been found that such feed constructions do not always operate reliably and certainly require maintenance and are susceptible to failure.

It is an object of the present invention to provide a milking device of the kind mentioned in the preamble which does not have the abovementioned drawbacks or at least to a lesser extent, or to provide a usable alternative for the known devices.

This object is achieved by the invention by means of a milking device according to the claims, in particular a milking device comprising a platform which is rotatable in a direction of rotation and has an edge and a plurality of milking stations, and having milking means for milking a dairy animal and a plurality of feeding troughs which are distributed along the edge, outside next to the platform on the fixed world frame and within reach of the dairy animals on the milking stations.

Such an inherently simple solution dispenses with the need for, for example, fold-away feeding troughs which are often necessary in the prior art to give dairy animals access to the milking stations. In all cases, the feeding troughs would co-rotate with the platform, thus requiring likewise co-rotating contacts and connections to the outside world, in particular for connections to the concentrate store. This is not necessary in the case of the present milking device, thus making a much simpler and more reliable construction possible. In this case, the invention uses the insight that a dairy animal can readily help itself to feed at the feeding troughs which its feeding station passes. It eats its meal from different cribs as it were. In addition, the invention offers the considerable advantage that a dairy animal does not have to go hungry and it will therefore not become restless when a feeding trough does not contain any feed, for example because the local supply has run out or because a metering device has become stuck. The latter may obviously also occur in the case of the invention, but then a subsequent feeding trough will be able to provide feed. This is not the case with co-rotating feeding troughs.

It should be noted here that each of the feeding troughs is accessible during at least part of the time for which the dairy animal remains on the platform. Thus, the invention does not relate to feeding troughs which have been provided elsewhere, such as feeding stations further down the animal shed. Of course, these are also accessible to the dairy animals, but they are separate from the platform.

Particular embodiments are described in more detail in the dependent claims and in the following part of the description.

The milking device according to the invention is provided with milking means for milking the dairy animals. Thus, a store comprising milking means may be provided near the entrance for the dairy animals, which milking means can then be connected by a milker or preferably by a milking robot which is known per se. It is also possible to have a milking robot trolley drive between and via the milking stations, which milking robot trolley is provided with milking means, as described, inter alia, in NL1033090 and NL1024522. In particular, the milking stations are each provided with milking means for milking a dairy animal. Thus, it is very easy to monitor the path of each milking means and each lot of milk. This is particularly attractive if the platform is provided with milking stations which are separated from each other by means of partitions.

In particular, the platform is formed in the shape of a ring with an inner edge, and an adjoining access portion to allow the dairy animals to access and leave the platform. Although a platform which is configured as a circle with fixedly arranged feeding troughs on the inner side is not ruled out, such a configuration not only has an unnecessarily large moving surface, but also still requires the connections of the feeding troughs, or at least of a storage container, with the outside world to be movable. A platform which is configured as a ring has the advantage that the moving surface is smaller and, in addition, that the dairy animals can be approached from two sides from the outside world. In any case, dairy animals will have to be able to walk onto and off the platform. To this end, an access portion is provided comprising an entrance and an exit, which are usually situated next to one another, in order to make it possible for the dairy animals to rotate as long as possible.

In an embodiment, the plurality of feeding troughs are substantially evenly distributed over the inner edge. The dairy animals can then walk onto the milking stations in a straight line and they will receive their feed from the inner edge of the platform, with the milking means being connected from the outer side, resulting in a so-called external milker. In this embodiment, the dairy animals will be offered feed substantially regularly, which is useful in order to keep the animals calm during milking. In this case, it should be noted that, with a circle-shaped platform, the edge will be the outer edge, whereas the edge with a ring-shaped platform will be either the inner edge or the outer edge, as described. In any case, the edge will be that edge of the platform which the dairy animals on the platform can reach with their snouts. Incidentally, although it is not necessary to distribute the feeding troughs over the entire edge, it is preferred, due to the abovementioned reason.

In an alternative embodiment, the plurality of feeding troughs are substantially evenly distributed along the outside of the platform, with the exception of the access portion. Here, the dairy animals will thus stand with their heads facing outwards during the rotation. The animals are then milked on the inner side of the platform. Such an arrangement is also referred to as an internal milker. Prior-art internal milkers in particular suffer from problems if the feeding troughs are provided on the platform, since these obviously often have to make way in order to allow the dairy animals to enter and leave the platform. Although it is not necessary to provide fold-away feeding troughs, since the animals can also walk around them, this would require still more space and the animals already require more space in order to walk onto the platform compared to an external milker, as they have to turn around in order to do so. In addition, the feeding trough will still be in the way when the dairy animals leave the milking station. Thus, the present invention offers very significant advantages in the case of such an internal milker. It will be clear that the feeding troughs will not be provided at the location of the entrance to and exit from the platform in order not to disturb the traffic of the dairy animals.

In particular, the number of feeding troughs is substantially equal to the number of milking stations. In this arrangement, each dairy animal has a trough, resulting in a maximum degree of relaxation for the animals. In this case, the expression "substantially equal" means that the number of feeding troughs is either exactly equal to the number of milking stations or is 1 or at most 2 less, in case no feeding trough has been placed at the location of the exit, in order to prevent loitering, and optionally near the entrance, in order, for example, to ensure a more orderly entry to the platform. An example is an internal milker which has already been mentioned above and which has at least two milking stations without troughs, namely at the location of the access portion, comprising the entrance and exit. However, it is also possible to provide other, smaller numbers of feeding troughs, such as half the number of milking stations. In this case, one spot is omitted in each case, for example in order to allow the animals to process the feed by chewing.

In this case, in embodiments, the platform is configured to continue to rotate a milking station stepwise. Stepwise rotation here has the advantage that the dairy animals are allowed to stand still for some time at each feeding trough, thus resulting in more comfort during feeding. In addition, the comfort for the animals during entry is increased and the milking means can also be connected without unnecessary time pressure. Thus, rotation does not have to take place at regular intervals, but for example only when the milking cups have been successfully connected. Alternatively, in embodiments, the platform is configured to rotate at a substantially constant speed. This constant speed offers the significant mechanical advantage that no decelerating or accelerating movements, or hardly any, have to be carried out. This limits the mechanical load and the power consumption, and also increases the comfort for the animals while they are standing on the platform.

Advantageously, the milking device comprises a connecting robot which is provided outside the platform and is configured to connect the milking means to the teats of the dairy animal. The connecting robot may, in principle, correspond to, for example, the connecting robot of the well-known box milking robot. For more information regarding, for example, teat-recognition means and the like, reference is also made to the well-known box milking robots, such as Lely Astronaut™ and DeLaval VMS™. In particular if the milking means are provided on each milking station, the connecting robot only has to connect those milking means to the dairy animal at said milking station. However, it should be stressed that it may be advantageous to provide a connecting robot with a plurality of robot arms, in particular configured to connect the milking means for one dairy animal to different stations on the platform. For example, a first robot arm may connect one or two milking means for a first dairy animal to a first milking station, while a second robot arm, substantially simultaneously, connects one or two milking means for a subsequent dairy animal to an adjacent milking station. When the platform is rotated along, said subsequent dairy animal will arrive at the first robot arm, where one or two additional milking means can be connected. Thus, connecting the milking means for each station on the platform does not have to take up an excessive amount of time, so that the dairy animals can, for example, quickly take their positions on the platform. As a result thereof, it is possible, for example, to keep the design of each of the robot arms relatively simple (since they can be less quick and less sophisticated).

As an alternative or in addition, it is also possible to provide a pretreatment robot which is configured to carry out a milking-related operation which is not the connection of the milking means. Consideration may be given in this case to cleaning and/or stimulating the teats of the dairy animal by means of a brush, cleaning or premilking cup, etc. which is to be fitted to the teats. As an alternative or in addition, it is furthermore possible to provide an aftertreatment robot which is configured to subject in particular the teats and/or the udder of the dairy animal to an aftertreatment, such as a spray nozzle for spraying aftertreatment agent onto the latter.

Advantageous embodiments are characterized by the fact that at least one, and preferably each, of the feeding troughs comprises a trough-blocking means which blocks access to the feeding trough for at least part of the time during which the feeding trough is situated between two milking stations. This prevents a dairy animal from trying to obtain feed from the feeding trough for too long as its milking station continues to rotate. This measure provides more relaxation for the dairy animals and improves the safety of the animals. It also avoids uncertainty regarding which dairy animal is eating from which trough, so that the amount of feed provided to an animal can be clearly determined. The time period during which the trough-blocking blocking means blocks the feeding trough may be dependent on the manner in which the platform rotates. If the milking device is, for example, a stop-start carousel, it is sufficient if the (or each) trough-blocking means blocks the associated feeding trough during the rotating movements. In the case of a platform rotating at a constant speed, it is for example possible to block the entrance for a predetermined part of the time by means of the trough-blocking means. In this case, the predetermined part is dependent on the design of the milking stations, in particular on the width and the mutual distance thereof, the distance between milking station and feeding trough and the freedom of movement of the dairy animals at the milking station. The trough-blocking means may comprise a trough-closing means, such as a flap, but may also, for example, be a displaceable rod or the like in the trough itself, which is able to force, for example, the snout of an animal out of the trough. Such trough-blocking and closing means are known per se, for example from EP1236393A2.

In advantageous embodiments, the milking device comprises a fixedly arranged feed storage container and fixedly arranged and non-moving connections between the feed storage container and the feeding troughs. This is a further development of the abovementioned advantage of having fewer or even no moving connections, at least not for the feed part. Thus, no concentrate or dirt is able to affect such connections. A significant advantage of the lack of such movable connections is the fact that a single feed storage container which is connected to the feeding troughs suffices. Replenishing is thus greatly simplified when compared to replenishing separate stores for each feeding trough.

In embodiments, the milking device according to the invention advantageously comprises a feed-supply device which is configured to supply feed to the plurality of feeding stations, comprising at least one feed storage container, at least one metering device and a control unit for controlling the at least one metering device. By means of such a feed-supply device, feed can be supplied to the dairy animals in the plurality of feeding troughs. This may be a coupled action or may be feeding on demand, in which case the animal itself indicates whether it wants another portion of feed.

In particular, the control unit is configured to supply to each dairy animal a predetermined amount of feed by providing a plurality of partial amounts using the metering devices, each in one of the plurality of feeding troughs and equal to the predetermined amount of feed when taken together. In modern dairy farming, it is of great importance, both from an economic and animal management point of view, to not only know the amount of concentrate per dairy animal, but also to control it. In the present invention, said predetermined amount can be distributed over the plurality of feeding troughs, in which case the one or more metering devices meter the animal feed over (and into) the feeding troughs. Incidentally, the amount of feed to be provided does not have to be the same for each feeding trough. It is for example also possible to decide to dispense more feed at the start of the milking operation, i.e. to dispense more feed in the first feeding trough(s) than in the last feeding trough(s). This measure can quickly put the dairy animals at ease, while also taking into account the often reduced appetite at the end of the milking operation. Other feed-dispensing regimens are also possible.

Advantageously, the device comprises an animal recognition device, configured to provide an animal identity signal to the control unit, wherein the control unit and/or the metering devices are configured to dispense an amount of feed on the basis of the animal identity signal. With the abovementioned animal management, an individual supply of feed to an animal is still better than a supply of feed at herd level. In order to be able to achieve this, an animal recognition device which is known per se has been provided. As a result thereof, it is known which dairy animal is situated at which milking station, and thus it is also known which feeding trough is accessible to which dairy animal and when. In this case, the control unit records if the amount of feed dispensed to each dairy animal is in line with the feed allowance for said individual dairy animal.

In embodiments, the control unit and/or the metering devices are configured to dispense substantially equal partial amounts, in particular on the basis of the animal identity signal. This is a simple way of monitoring the feed allowance, since it requires no additional sensors or couplings between the feeding troughs. In this case, it is assumed that the dairy animals are given their requirement distributed over so many feeding troughs that the portion per feeding trough is so small that the dairy animal eats it completely in each case. Thus, the feed control in the control unit can be of a very simple design. If desired, it can still be adjusted for each individual dairy animal, so that individual portions specifically adapted for each dairy animal are provided which are, however, identical for each feeding trough.

Advantageously, the milking device furthermore comprises a residual feed-measuring device in at least one and preferably in each of the feeding troughs, which is configured to measure the amount of residual feed in the associated feeding trough and to emit a residual feed signal to the control unit. Thus, the actual amount of feed eaten by each individual animal can be determined, which renders animal management still more reliable and refined. This is due to the fact that it is not only possible to determine how much an animal has eaten, but also how much feed has to be poured into the trough for the next animal in order to ensure that it receives its assigned portion. This prevents the next animal from receiving an additional part portion which is undesirable. Incidentally, this may also be prevented by throwing away said residual feed before it becomes available to the next animal—not only is this wasteful, but also unnecessary as the amount can simply be processed when determining the new portion size. It should be noted that this does not apply if the composition differs for each animal as well, but this invention is not aimed at that. In particular, the control unit is configured to adapt, on the basis of at least one and more particularly each of the residual feed signals, the partial amount in at least one of the feeding troughs. In those cases where, for whatever reason, a part portion was not completely finished, the control unit can calculate the total amount of feed still to be dispensed on the basis of the residual feed signal. The latter amount can then be dispensed, optionally in an equal manner, over the subsequent feeding troughs.

The invention will be explained below with reference to a few non-limiting embodiments and the drawing, in which.

Figure 1:
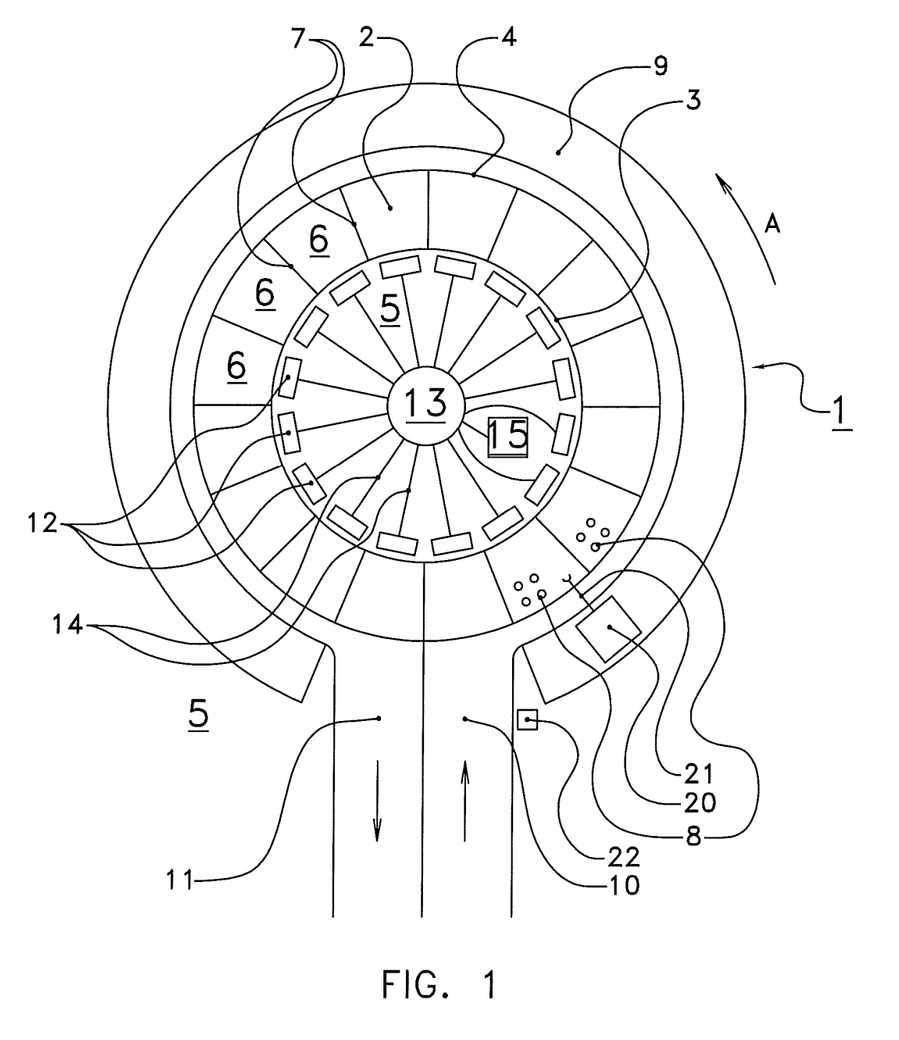
FIG. 1 diagrammatically shows a milking device 1 according to the invention.

FIG. 1 diagrammatically shows a milking device 1 according to the invention which comprises a platform 2 which is rotatable in the direction of the arrow A, and has an inner edge 3 and an outer edge 4. The outside world is denoted by reference numeral 5. A plurality of milking stations 6 with a partition wall 7 in between and each provided with milking means 8 are provided on the platform 2. An operator's working pit is denoted by reference numeral 9, and an entrance to and an exit from the platform are denoted by reference numerals 10 and 11, respectively.

The milking device 1 also comprises a feeding device comprising a plurality of feeding troughs 12, a feed storage container 13 with connections 14 and a control unit 15. Reference numeral 22 denotes an animal recognition device.

When using this milking device, for example cows (or other dairy animals, for the sake of convenience cows in the remainder of this text), not shown here, will reach the platform via the entrance 10. Once they have arrived there, each cow will occupy a milking station 6 and will be kept at said milking station by means of an optionally open partition wall and fences or the like (not indicated in any more detail here) along the inner edge 3 and the outer edge 4. Upon entry, the cow passes the animal recognition device 22 which recognises the animal, for example by reading a transponder which is worn by the animal. It is possible to search a data file, for example in the control unit 15, in order to find out which setting has to be used during milking, but also for example whether there is still feed due to the cow, and if yes, how much feed the cow is still due. Incidentally, the animal recognition device 22 may also be placed, by way of example and advantageously, at the first milking station, in particular at the associated trough 12. Thus, it is possible to prevent a cow from skipping a milking station and only entering the next available milking station.

Thereafter, the cow can be milked by connecting the milking means, or milking cups, 8 by means of a milker (not shown) in the operator's working pit 9. Near the exit 11, the milking cups 8 can then be removed from the teats, if desired automatically, following which the cows can leave the platform 2 via said exit 11. The milking device shown here is a so-called external milker, in which the dairy animals stand with their heads towards the centre of the platform and the milking cups are connected to the teats substantially from behind. The connecting robot 20 with one or more robot arms 21 which are configured to connect one or more of the milking cups 8 to the teats of the dairy cows is a significant alternative. If one or more of these connecting robots are provided, there is in principle no need to provide an operator's working pit 9. However, it is possible to retain the operator's working pit, so that reconnecting any milking cups which may have been kicked off or carrying out special treatments can still be performed by people in a simple manner. It is also possible to convert an existing milking device with an operator's working pit to a robot installation. It should be noted that connecting robots are sufficiently well-known per se.

During the milking operation on the platform 2, the cows are given, for example, concentrate in the feeding troughs 12. The latter are also connected to a feed storage container 13 via connections 14 which are likewise fixed, i.e. do not co-rotate, and are also connected to a control unit 15. The feeding troughs 12 are fixedly secured to the outside world 5, so that the milking stations occupied by cows will perform a lap past the feeding troughs 12. The cows will thus receive their feed from the various feeding troughs 12 which they pass. In this case, the control unit 15 ensures that the animals are given the correct portion of feed. The connections 14 connect the feed storage container 13 in the outside world 5 to feeding troughs 12, likewise in the outside world 5. This means that no complicated movable connections which are susceptible to malfunctions are required, and that the supply of animal feed, such as concentrate, from the feed storage container 13 to the feeding troughs 12 can take place in a more reliable way via stable, immovable connections 14 which, incidentally, may nevertheless be flexible. The connections 14 may, for example, comprise a pipe or other duct through which feed can be conveyed. In addition, the connections 14 may comprise one or more data and/or communication connections which may, however, also be wireless, for example.

The illustration shows sixteen milking stations 6 on the platform 2 as well as sixteen feeding troughs 12. Obviously, any other desired number of milking stations 6 on the platform 2 is also possible, as well as any other number of feeding troughs 12. It is also possible for the number of feeding troughs to differ from, and in particular to be smaller than, the number of milking stations. For example, the feeding trough 12 directly opposite the exit 11 and, if desired, the one directly opposite the entrance 10, could be omitted. In addition, it is possible to position the cows facing the opposite direction, that is with their heads facing to the outside, on the milking stations 6. In that case, the feeding troughs 12 will be provided on the outer edge 4 and no feeding troughs will usually be placed at the entrance 10 and exit 11. Such a milking platform is also referred to as an internal milker.

Figure 2A:
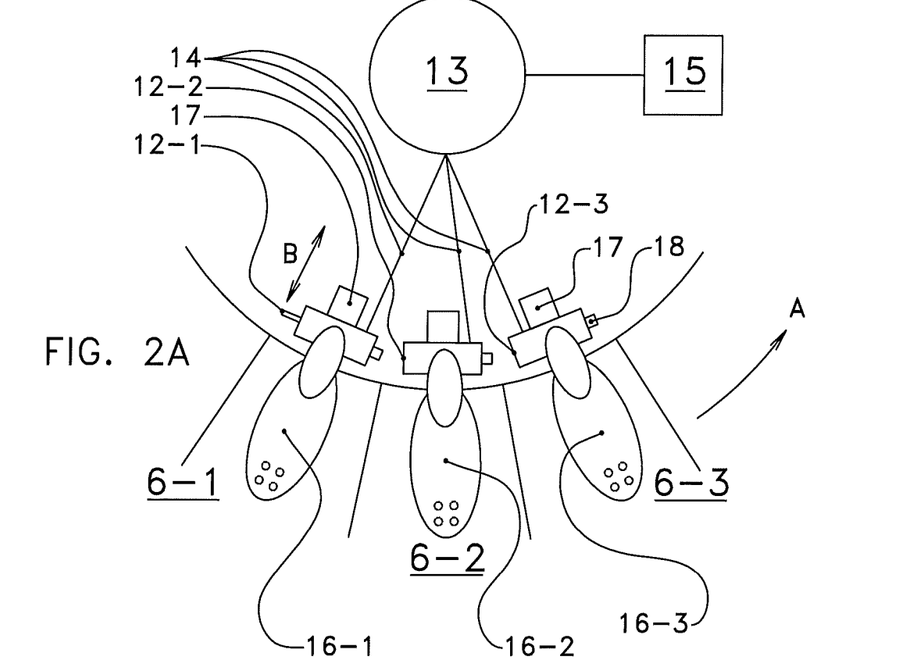
FIGS. 2A and 2B diagrammatically show a detail of the milking device from FIG. 1 in two positions.
Figure 2B:
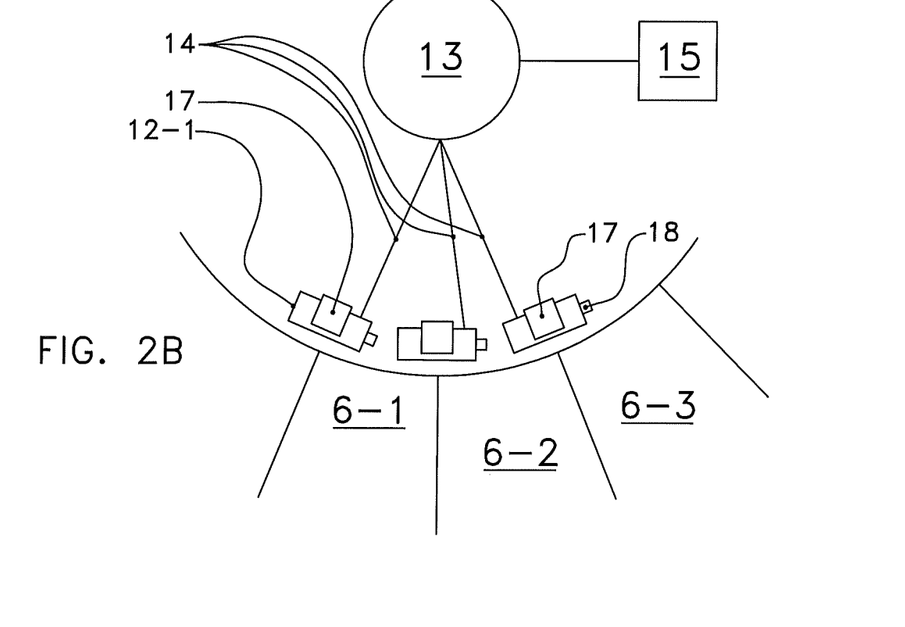

FIGS. 2A and 2B diagrammatically show a detail of the milking device from FIG. 1 in two positions, rotated through an angle.

FIG. 2A shows three milking stations 6-1, 6-2 and 6-3, in each case occupied by a dairy animal 16-1, 16-2 and 16-3, respectively, which eats from respective feeding troughs 12-1, 12-2 and 12-3. Reference numeral 17 denotes a trough closure element, in this case a flap which is movable in the direction indicated by arrow B. Reference numeral 18 denotes a residual feed meter.

In the position shown in FIG. 2A, the cows 16 are able to reach the troughs 6 with their heads in order to eat feed therefrom. The trough closure elements 17 are in the open position, and can be operated by the control unit 15 or else by a mechanical control unit which is coupled to the drive (not shown) of the platform. For example, each cow 16 receives the same amount of feed in each trough, i.e. $\frac{1}{16}$ of the total ration. Incidentally, said ration, which is based on the feed allowance, may differ for each cow. The amount may be determined by searching a data file containing animal-specific amounts of feed, once the identity of the cow has been established. The feed can be provided by means of a feed-metering device (not shown), which is either provided on each of the feeding troughs or as a single central metering device.

The milking device may be a start/stop system, i.e. stand still when a cow enters a milking station 6, and subsequently rotate along (quickly) until the next station is situated at the entrance and then brought to a standstill again in order to offer a cow the opportunity to enter a stationary milking station 6. Thus, each cow 16 is given ample opportunity to eat an amount of feed from the respective feeding trough. As soon as the platform starts to rotate, the feeding troughs 12 may be closed by moving the trough closure elements 17 in the direction of the arrow B into the closed position. It is also possible to configure such trough closure elements as trough dispellers, for example like a rod or the like which is raised from the trough in order to dispel the head of a cow. Incidentally, trough closure elements are not necessary, for example when the platforms rotate very slowly and there is no risk of pinching or, for example, when the number of milking stations, more specifically: the number of troughs, is so large that only very little feed is provided in each trough, which will very likely have been eaten by the cow before the platform continues its rotation.

Nevertheless, irrespective of whether the milking device has a start/stop system or rotates continuously, at a certain point in time, it will continue to rotate and reach the position in FIG. 2B. In this case, for example the cows are no longer shown. Nevertheless, it is clear that, in this position, the cows could reach a feeding trough by turning either to the left or turning to the right. This makes it hard to establish from which trough the cow is eating. Moreover, if residual feed is present in the troughs 12, it becomes very hard to establish how much each cow has eaten. Advantageously, each feeding trough is therefore closed during rotation of the platform, at least as long as an average-sized cow could reach two adjacent feeding troughs. This is also a suitable moment to have any residual feed in the troughs 12 measured by the residual feed meters 18. On the basis thereof, it is then possible to determine how much each cow has eaten, and thus also which amount can still be fed to the cow at a subsequent feeding trough. In the latter case, any residual feed which may still be present in said subsequent feeding trough may in turn be taken into account.

Figure 3:
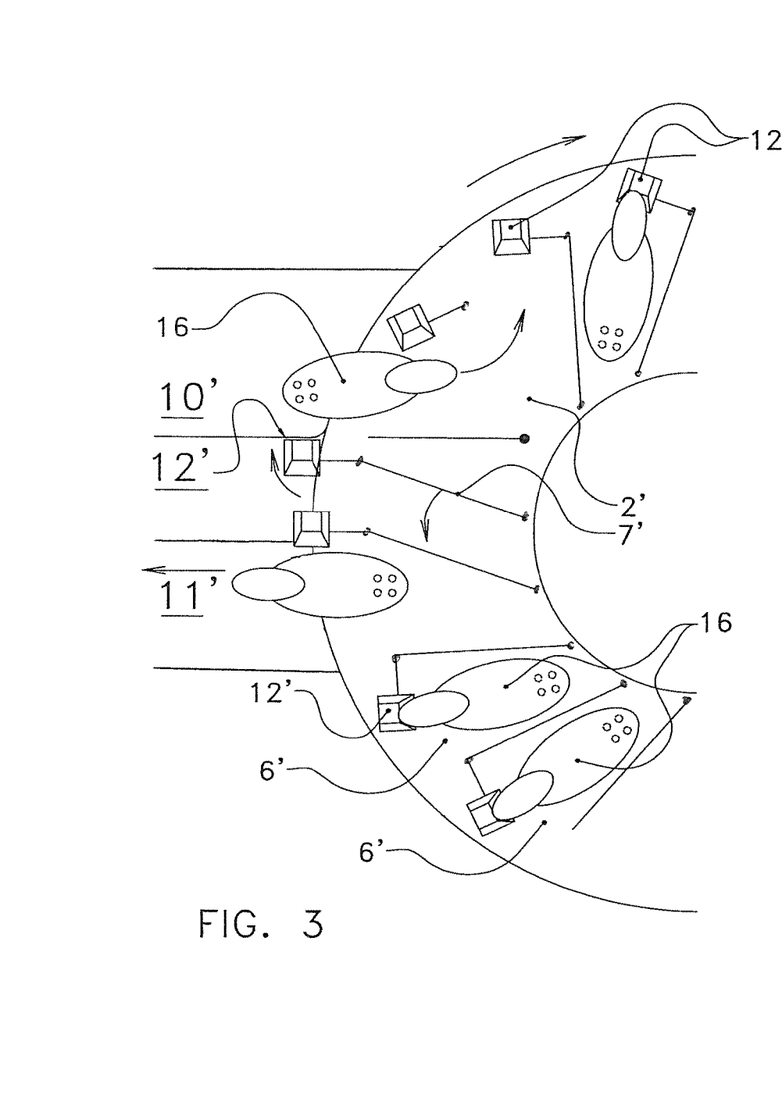
FIG. 3 diagrammatically shows a part of an internal milker according to the prior art.

FIG. 3 diagrammatically shows a part of an internal milker according to the prior art. For further details, the reader is referred to document EP1733615. FIG. 3 shows the relevant items, denoted by reference numerals with an accent, such as a platform 2' with milking stations 6', separated by a movable partition wall 7'. Reference numeral 12' denotes rotatable feeding troughs on the outer edge, which dairy animals 16 have to walk around when entering the platform 2' via entrance 10' and when leaving the platform 2' via exit 11'.

In particular due to the rotatable feeding troughs, the illustrated device is an unnecessarily complicated structure which, in addition, results in limitations for the connections to said feeding troughs, and thus also in the feed programs which can be achieved thereby.

Figure 4:
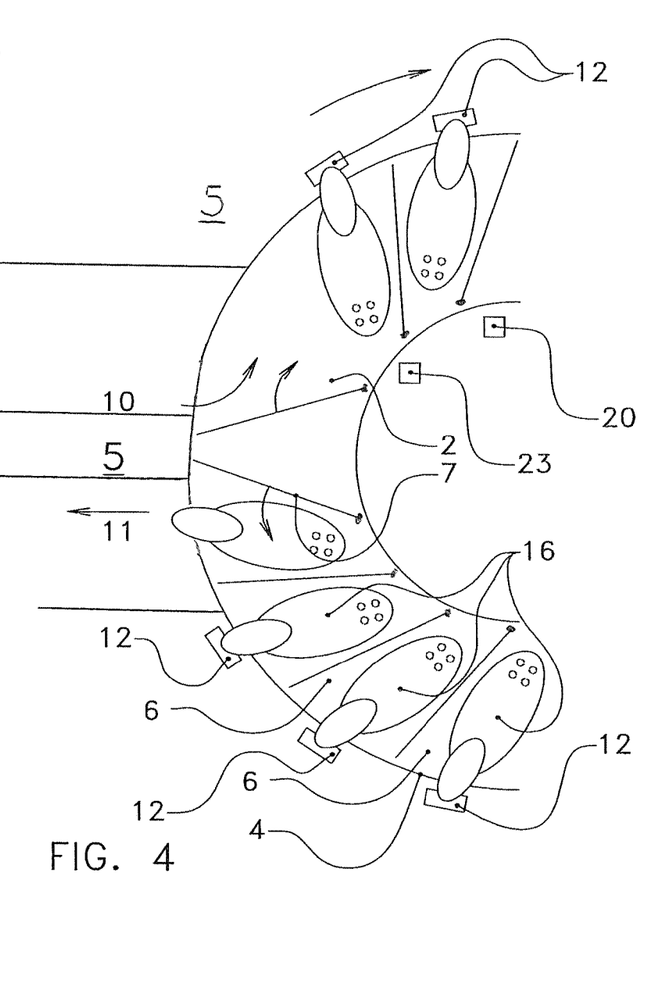
FIG. 4 diagrammatically shows a part of an internal milker according to the invention.

FIG. 4 diagrammatically shows a part of an internal milker according to the invention. As in the rest of the drawing, identical parts have been indicated by the same reference numerals. In addition, reference numeral 23 denotes a pretreatment robot.

It can be seen here that the platform 2 does not contain any rotatable feeding troughs, but only movable partition walls 7. The dairy animals thus do not have to walk around feeding troughs. By contrast, feeding troughs 12 are provided outside, along the outer edge 4 of the platform 2, which feeding troughs are accessible by the dairy animals from their milking stations 6. No feeding troughs are provided opposite the entrance 10 and exit 11 nor in between. Advantageously, the platform is of the type which is configured to rotate towards the subsequent milking station 6 stepwise. Thus, each new dairy animal 16 is given sufficient time to safely position itself on its milking station. What is perhaps more important is the fact that the pretreatment robot 23 and the connecting robot 20 definitely have sufficient time to carry out their respective tasks, as the platform will not rotate along until they have done so. In this case, the pretreatment robot may have the task, for example, of cleaning and/or stimulating the dairy animal. To this end, the pretreatment robot may comprise, for example, a spraying robot which is configured to spray a cleaning agent onto the teats. Alternatively or in addition, the pretreatment robot may comprise, for example, a teat brush or cleaning cup. In use, the platform will rotate to a subsequent milking station as soon as the last dairy animal which stepped on is safely positioned, a desired pretreatment by the pretreatment robot 23 has taken place (with another, previous dairy animal), and the connecting robot 20 has successfully connected the milking cups (not shown here). All this offers the advantage that a dairy animal can in each case eat from a feeding trough which is in front of the milking station at that moment without being disturbed, said eating only being interrupted when the platform rotates to a subsequent milking station.

The illustrated embodiments are only intended and shown as non-limiting examples. The scope of protection is defined by the attached claims.

The invention claimed is:

1. A milking device, comprising:
   a platform which is rotatable in a direction of rotation and includes an edge and a plurality of milking stations, and milking means for milking a dairy animal;
   a plurality of feeding troughs which are distributed along the edge outside of the platform, and fixed on a fixed world frame and configured to be within reach of dairy animals on the milking stations; wherein the plurality of feeding troughs are not rotatable with the platform when the platform rotates.

2. A milking device according to claim 1, wherein each of the plurality of milking stations includes the milking means for milking of a dairy animal.

3. A milking device according to claim 1, wherein the platform is formed in a shape of a ring with an inner edge, the platform edge is the inner edge of the ring, and the platform has an adjoining access portion to allow the dairy animals to access and leave the platform.

4. A milking device according to claim 3, wherein the plurality of feeding troughs are substantially evenly distributed over the inner edge.

5. A milking device according to claim 3, wherein the plurality of feeding troughs are substantially evenly distributed along the outside of the platform, with the exception of the access portion.

6. A milking device according to claim 1, wherein a number of the feeding troughs is substantially equal to a number of the milking stations.

7. A milking device according to claim 1, wherein the platform is configured to continue to rotate a milking station stepwise.

8. A milking device according to claim 1, wherein at least one, or each, of the feeding troughs comprises a trough-blocking means that blocks access to the feeding trough for at least part of a time during which the feeding trough is situated between two milking stations.

9. A milking device according to claim 1, further comprising a fixedly arranged feed storage container and fixedly arranged and non-moving connections between the feed storage container and the feeding troughs.

10. A milking device according to claim 1, further comprising a feed-supply device configured to supply feed to the plurality of feeding stations, comprising at least one feed storage container, at least one metering device, and a control unit for controlling the at least one metering device.

11. A milking device according to claim 10, wherein the control unit is configured to supply to each dairy animal a predetermined amount of feed by providing a plurality of partial amounts using the at least one metering device, each partial amount in a different one of the plurality of feeding troughs and equal to the predetermined amount of feed when taken together.

12. A milking device according to claim 11, further comprising an animal recognition device, configured to provide an animal identity signal to the control unit, wherein the control unit and/or the at least one metering device are configured to dispense an amount of feed on the basis of the animal identity signal.

13. A milking device according to claim 11, wherein the control unit and/or the at least one metering device are configured to dispense substantially equal partial amounts, on the basis of the animal identity signal.

14. A milking device according to claim 11, further comprising a residual feed-measuring device in at least one or each of the feeding troughs, which is configured to measure an amount of residual feed in the associated feeding trough and to emit a residual feed signal to the control unit, wherein the control unit is configured to adjust the partial amount in at least one of the feeding troughs on the basis of at least one or each of the residual feed signals.

15. A milking device, comprising:
   a platform rotatable in a direction of rotation, the platform including a plurality of milking stations; and
   a plurality of feeding troughs fixed in place and distributed outside the platform and configured to be within reach of dairy animals on the milking stations,
   wherein the plurality of feeding troughs are not rotatable with the platform when the platform rotates.

16. A milking device according to claim 15, wherein each of the plurality of milking stations includes milking cups for milking a dairy animal.

17. A milking device according to claim 15, wherein the platform is formed in a shape of a ring with an inner edge and an outer edge, the platform edge is the inner edge of the ring, and the platform has an adjoining access portion to allow the dairy animals to access and leave the platform.

18. A milking device according to claim 17, wherein the plurality of feeding troughs are substantially evenly distributed over the inner edge.

19. A milking device according to claim 15, wherein the platform is configured to continue to rotate a milking station stepwise.

20. A milking device, comprising:
a platform rotatable in a direction of rotation, the platform including a plurality of milking stations;
a plurality of feeding troughs distributed outside the platform and configured to be within reach of dairy animals on the milking stations, the feeding troughs configured so as not to co-rotate with the platform.

21. A milking device according to claim 1, wherein the device is configured so that each dairy animal may eat a partial amount of feed from a plurality of feeding troughs, and a sum of partial amounts of feed is a predetermined amount of feed.

* * * * *